US008385205B2

(12) United States Patent
Kenney (10) Patent No.: US 8,385,205 B2
(45) Date of Patent: Feb. 26, 2013

(54) MODELING PACKET TRAFFIC USING AN INVERSE LEAKY BUCKET

(75) Inventor: John Belden Kenney, Granger, IN (US)

(73) Assignee: Tellabs Operations, Inc., Naperville, IL (US)

( * ) Notice: Subject to any disclaimer, the term of this patent is extended or adjusted under 35 U.S.C. 154(b) by 145 days.

(21) Appl. No.: 11/858,856

(22) Filed: Sep. 20, 2007

(65) Prior Publication Data

US 2009/0080331 A1 Mar. 26, 2009

(51) Int. Cl.
*G01R 31/08* (2006.01)

(52) U.S. Cl. .................................... 370/235.1; 370/428

(58) Field of Classification Search ............... 370/235.1
See application file for complete search history.

(56) References Cited

U.S. PATENT DOCUMENTS

| | | | | |
|---|---|---|---|---|
| 5,640,389 | A * | 6/1997 | Masaki et al. | 370/418 |
| 6,590,885 | B1 | 7/2003 | Jorgensen | |
| 6,608,816 | B1 | 8/2003 | Nichols | |
| 6,654,343 | B1 | 11/2003 | Brandis et al. | |
| 7,388,837 | B1 * | 6/2008 | St-Denis et al. | 370/235 |
| 2002/0196785 | A1 | 12/2002 | Connor | |
| 2003/0031131 | A1 * | 2/2003 | Bottiglieri et al. | 370/235 |
| 2003/0128667 | A1 * | 7/2003 | Matsufuru | 370/230.1 |
| 2003/0214948 | A1 | 11/2003 | Jin et al. | |
| 2004/0001491 | A1 * | 1/2004 | Ruutu et al. | 370/395.4 |
| 2005/0074011 | A1 | 4/2005 | Robotham et al. | |
| 2005/0175014 | A1 | 8/2005 | Patrick | |
| 2005/0286524 | A1 | 12/2005 | Bennett | |
| 2006/0146710 | A1 * | 7/2006 | Roy | 370/235 |

OTHER PUBLICATIONS

Jiwasurat et al., "Hierarchical Shaped Deficit Round-Robin Scheduling", IEEE Globecom 2005, pp. 688-693, Nov. 28, 2005.

* cited by examiner

*Primary Examiner* — Mark Rinehart
*Assistant Examiner* — Matthew Hopkins
(74) *Attorney, Agent, or Firm* — Fitzpatrick, Cella, Harper & Scinto (57) ABSTRACT

An apparatus, method, and computer program of modeling packet traffic in terms of Leaky Bucket parameters. The Leaky Bucket parameters are tested based on conformance of packet traffic. If a result of the testing is nonconformance of the packet traffic, one or more of the Leaky Bucket parameters is modified such that the packet traffic is conforming. The one or more modified Leaky Bucket parameters is stored in a computer-readable storage medium.

20 Claims, 6 Drawing Sheets

MODELING PACKET TRAFFIC USING AN INVERSE LEAKY BUCKET

BACKGROUND

1. Field

Example aspects of the invention relate generally to devices, systems, methods, and computer programs for modeling network packet traffic, and more particularly to modeling traffic in terms of Leaky Bucket parameters.

2. Related Art

Many present-day networking applications apply constraints to the flow of packet traffic in the network. For example, a network service provider might offer multiple levels of service, e.g., different maximum download speeds, at different costs. A user selects a level of service, and the service provider's system limits the user's download rate based on a service contract, which specifies the maximum download rate for the user. Often these applications utilize Leaky Buckets (LBs) to limit packet traffic to the specified "rate" of data flow.

In particular, LBs have a state that varies between an upper bound (defined in terms of the tolerance) and a lower bound (usually zero). In some LBs, when a conforming packet arrives the state increases by an amount proportional to the packet length and inversely proportional to the LB rate, and whenever the state is greater than zero, the state decreases (i.e., the LB "leaks downward") at a constant rate of one unit per unit time. In other words, the bucket's "level" rises as it is filled with packet data, and the level decreases as packet data leaks out of the bucket. When the state leaks to the lower bound of zero, the state stops leaking and remains at zero. At the time of a packet arrival, the state is not allowed to exceed the upper bound, or "tolerance," often abbreviated "L" and defined in units of seconds. An arriving packet that finds the state above the upper bound is by definition nonconforming. One example of a "leak downward" LB is the F-GCRA (Frame-Based Generic Cell Rate Algorithm).

Some other leaky buckets work in the opposite direction, for example, the state represents a credit that is increased at a constant rate up to an upper bound and that is decreased (consumed) by an arriving conforming packet.

Two LB parameters are typically used to characterize how an LB limits packet traffic: the rate of data flow; and a tolerance (L). The rate is usually expressed as its reciprocal (T). In F-GCRA, for example, T is the inverse of Minimum Cell Rate (MCR). The tolerance (L) is sometimes referred to as a maximum burst size, a burst tolerance, or a delay variation tolerance. Accordingly, utilizing an LB requires setting the LB parameters.

However, it can be difficult to specify appropriate LB parameters T and L for a given traffic flow. As a consequence, for example, a user might not know whether to choose a high-speed service or a low-speed service because the user does not know how to characterize his/her traffic. Similarly, without knowledge of the characteristics of the traffic within a network, a service provider might have difficulty determining how to best allocate bandwidth within the network to accommodate various traffic flows.

BRIEF DESCRIPTION

The foregoing can be addressed with a method, apparatus, system, and computer program for modeling packet traffic in terms of Leaky Bucket parameters. In this way, for example, a purchaser of network service can model his/her traffic to determine whether the terms of a network service agreement appropriately match the characteristics of his/her traffic, a network service provider can model packet traffic across a point in the network to determine whether LB parameters at that point require adjusting, etc.

The term "inverse leaky bucket" is sometimes used to refer to certain aspects of the example embodiments of the invention, in reference to the contrast between a LB, which tests the conformance of packets based on LB parameters, and aspects of the example embodiments of the invention that test (and adjust) LB parameters based on conformance of packets.

In accordance with an example embodiment of the invention, a method, apparatus and computer program for modeling traffic in terms of Leaky Bucket parameters are provided. The Leaky Bucket parameters are tested based on conformance of packet traffic. If a result of the testing is nonconformance of the packet traffic, one or more of the Leaky Bucket parameters is modified such that the packet traffic is conforming. The one or more modified Leaky Bucket parameters is stored in a computer-readable storage medium.

In one example embodiment of the invention, the Leaky Bucket parameters include a tolerance and a target packet inter-arrival interval, and the testing includes determining, based on packet traffic information, whether a provided packet of the packet traffic would be a conforming packet in a Leaky Bucket parameterized by the tolerance and the target packet inter-arrival interval. In this case, modifying a Leaky Bucket parameter includes generating, if the testing determines that the provided packet would not be a conforming packet, a new target packet inter-arrival interval for which the provided packet would be a conforming packet. The generating can include (i) generating an estimated new target inter-arrival interval based on the packet set information, (ii) updating arrival states of packets in the set based on the estimated new target inter-arrival interval, (iii) determining a most recent packet having an updated arrival state less than or equal to zero, (iv) outputting the estimated new target inter-arrival interval as the new target inter-arrival interval if the most recent packet having an updated arrival state less than or equal to zero is the beginning packet of the set, and (v) if the most recent packet having an updated arrival state less than or equal to zero is not the beginning packet of the set, redefining the set to begin with the most recent packet having an updated arrival state less than or equal to zero.

In another example embodiment of the invention, the packet traffic information includes packet set information of a set of one or more consecutive packets, the set including a beginning packet that is a most recent packet having an arrival state less than or equal to zero, and an ending packet that is a current packet, and the arrival state of a packet corresponds to a state of the Leaky Bucket at an arrival time of the packet.

In one example aspect of the invention, packet information of one or more packets preceding the beginning packet of the set is discarded. For example, a portion of memory storing the information can be released, with or without actually deleting the information from memory.

In another example embodiment of the invention, packet information of consecutive packets of the packet traffic is consolidated, and the packet traffic information is updated to include the consolidated packet information.

The example embodiments of the invention may be embodied in, without limitation, a method, apparatus, or computer-executable program instructions.

DETAILED DESCRIPTION

Example environments in which example embodiments of the invention can be used will now be described. Then, example embodiments of the invention will be described below. The descriptions of example environments and example embodiments are described with reference to the accompanying drawings. The example embodiments describe an apparatus, system, method, and computer program for modeling traffic in terms of Leaky Bucket parameters. Appendix A, the entire content of which is incorporated by reference, includes example Leaky Bucket diagrams and example pseudocode that can be used to implement an inverse Leaky Bucket according to one example embodiment of the invention.

Example Environments

Figure 1:
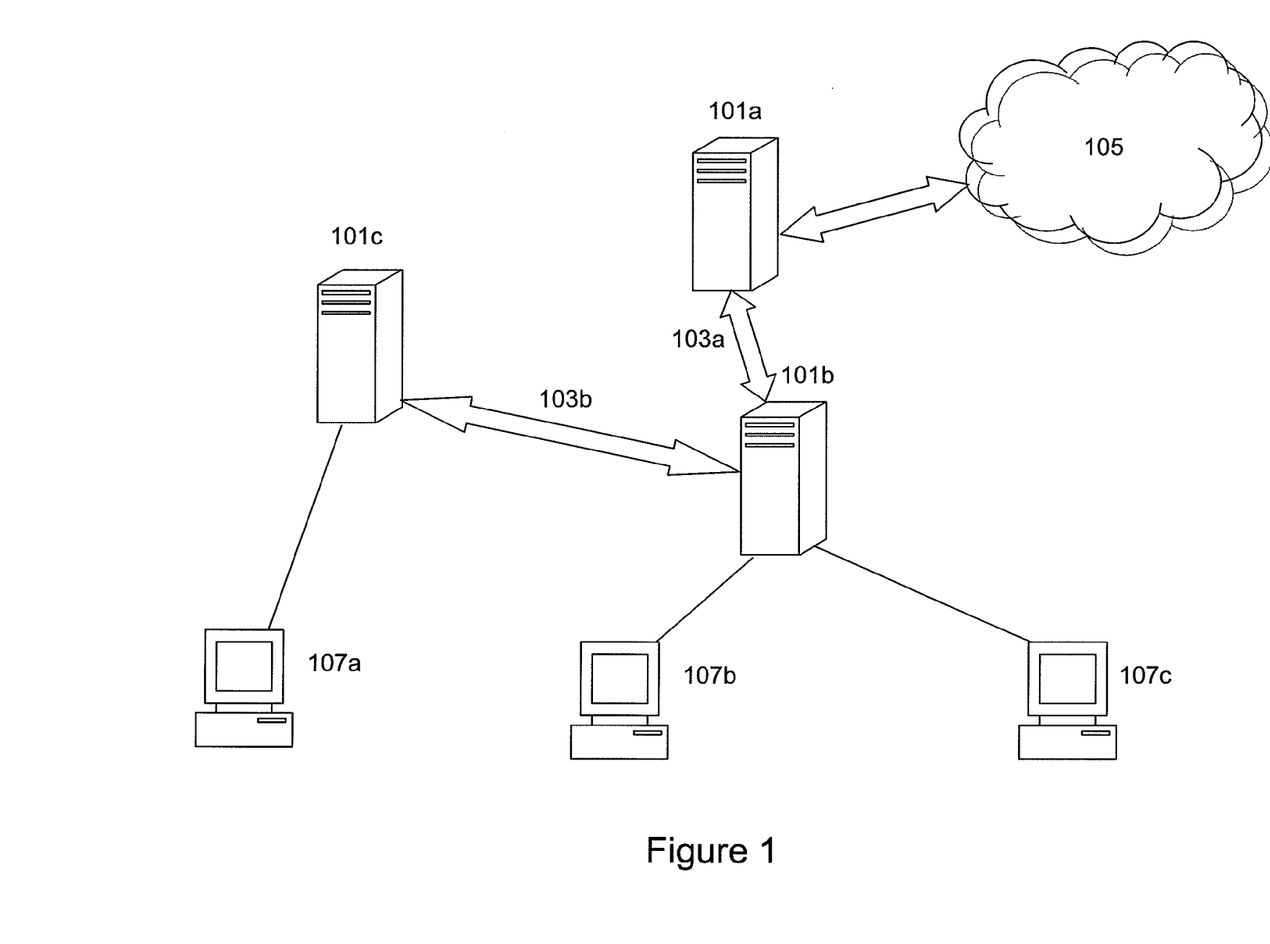
FIG. 1 is a block diagram of an example environment in which an example embodiment of the invention can be implemented.

FIG. 1 depicts one example environment in which an example embodiment of the invention can be implemented, representing a network arrangement including nodes $101a$, $101b$, and $101c$, which may be, for example, routers, switches, servers, and the like. Nodes $101a$, $101b$, and $101c$ may perform such functions as, for example, scheduling and routing packet traffic, processing packet payloads, responding to queries, and restricting traffic flow. The nodes are connected together via communication lines $103a$ and $103b$, which may be, for example, fiber-optic cable, coaxial cable, copper wire, and the like, existing as a single line or as a plurality of lines forming a trunk. Communication lines $103a$ and $103b$ may also be wireless lines of communication, for example, wireless LAN, Global System for Mobile Communications (GSM), Wi-Fi®, and personal area networks such as Bluetooth®. At least some of the components $101a$, $101b$, $101c$, $107a$, $107b$, $107c$, $103a$, and $103b$ may represent, for example, a local area network (LAN), a wide area network (WAN), or another type of network or portions thereof. Node $101a$ is connected to a network 105, which may be, for example, another LAN or WAN, or may be the Internet or other network.

In accordance with an example embodiment of this invention, at least one of nodes $101a$, $101b$, and $10c$, or information appliances $107a$, $107b$, and $107c$, can execute a program for modeling the packet traffic in terms of LB parameters. For instance, a node can execute a traffic modeling program to model the traffic it sends, receives, etc. From a hardware standpoint, a node typically includes one or more components, such as one or more microprocessors (also referred to as "controllers"), for performing the arithmetic and/or logical operations required for program execution. A node will also typically include disk storage media (also referred to as a "memory"), such as one or more disk drives for program and data storage, and a random access memory, for temporary data and program instruction storage. From a software standpoint, a node also contains application software resident on the disk storage media, which, when executed, directs the node in performing various functions. The application software runs on an operating system, for example a windowing operating system, which is also stored on the disk storage media. As is well known in the art, such nodes can run different operating systems, and can contain different types of application software, each type devoted to a different function, such as handling and managing data from a particular source, or transforming data from one format into another format.

FIG. 1 also depicts information appliances $107a$, $107b$ and $107c$, which are bi-directionally coupled to one or more nodes. Information appliances $107a$, $107b$ and $107c$ may be, for example, personal computers (PCs), handheld personal digital assistants with wireless capability, cellular phones, pagers, and the like. As with nodes, an information appliance will typically include one or more components, such as one or more microprocessors, disk storage media (also referred to as a "memory"), such as one or more disk drives for program and data storage, and a random access memory, for temporary data and program instruction storage. Information appliances also typically contains application software resident on the disk storage media, which, when executed, directs the information appliance in performing various functions. The application software runs on an operating system, for example a windowing operating system, which is also stored on the disk storage media. Information appliances can run different operating systems, and can contain different types of application software.

In the example environment illustrated in FIG. 1, nodes $101a$, $101b$, and $101c$ and communication lines $103a$ and $103b$ may be, for example, operated by a network service provider to provide network service to users that operate information appliances $107a$, $107b$, and $107c$. Users may include, for example, a business organization, trading group, one or more individuals, or any other applicable party. Routers $101a$, $101b$, and $101c$ may, for example, implement Leaky Buckets to limit packet traffic of each information appliance to a maximum rate based on a service contract with the user of the particular information appliance. Specifically, the service provider sets the LB parameters to limit the traffic in one example.

One of appliances $107a$-$107c$ might also implement a LB to ensure, for example, that the traffic it sends conforms to the LB operated by a network node. In other words, a LB could be executed on each end of a link, one to help shape the outgoing traffic and one to police the incoming traffic. In addition, if the link is bi-directional another pair of LBs could be executed by the same two nodes to control traffic in the other direction.

Figure 2:
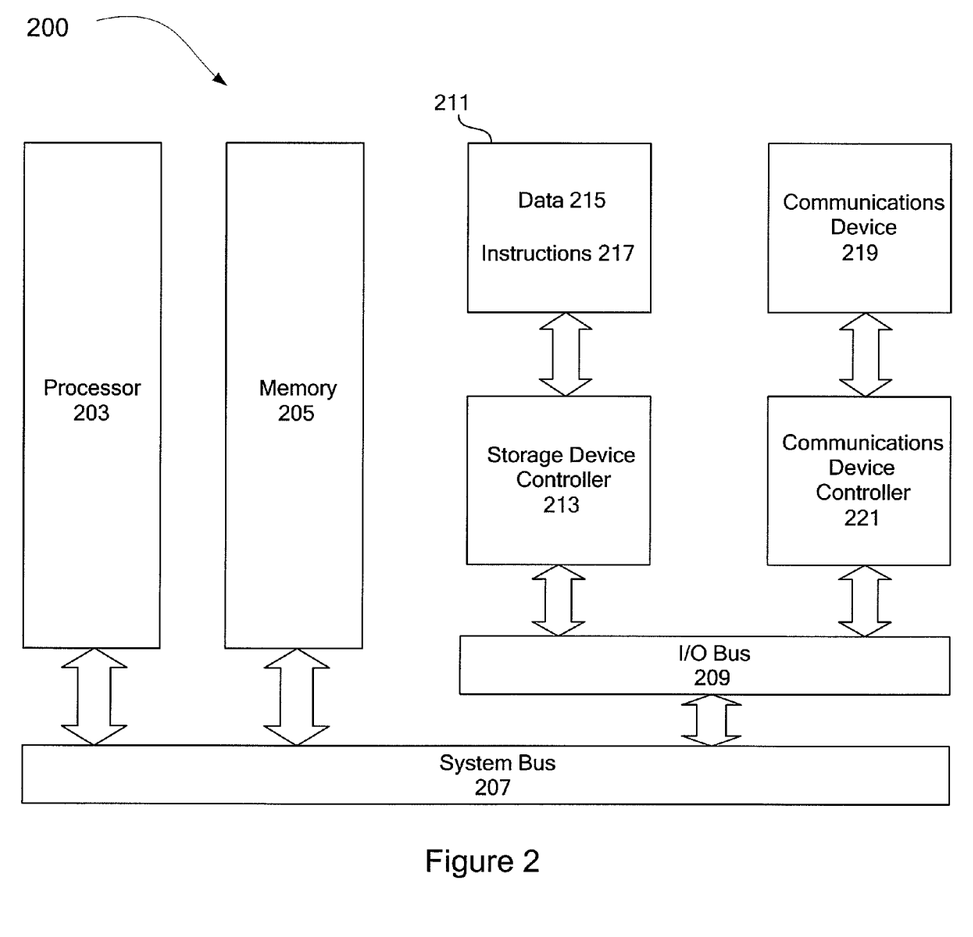
FIG. 2 is a block diagram of an example data processing system usable in the environment of FIG. 1.

The nodes and information appliances depicted in FIG. 1 may be implemented as data processing systems such as the data processing system shown in FIG. 2. Specifically, FIG. 2 is an architecture diagram for an example data processing system 200, which could be used as a node and/or a user's information appliance for performing modeling of packet traffic in accordance with various example embodiments of the invention, described in detail below.

Data processing system 200 includes a processor 203 coupled to a memory 205 via system bus 207. The processor 203 is also coupled to external Input/Output (I/O) devices (not shown) via the system bus 207 and an I/O bus 209. A storage device 211 having a computer-readable medium is coupled to the processor 203 via a storage device controller 213 and the I/O bus 209 and the system bus 207. The storage device 211 is used by the processor 203 and controller 213 to store and read/write data 215 and computer-executable program instructions 217 used to implement procedures to be described below. For example, those instructions 217 can perform any of the methods described below in conjunction with FIGS. 3A and 4A for modeling packet traffic in terms of Leaky Bucket parameters in real-time, or based on pre-stored packet traffic information.

The processor 203 may be further coupled to a communications device 219 via a communications device controller 221 coupled to the I/O bus 209. The processor 203 uses the communications device 219 for network communications, such as, e.g., file downloading, traffic routing by the service provider, transmission and receipt of data, control messages, etc.

In operation, the processor 203 loads the program instructions 217 from the storage device 211 into the memory 205. The processor 203 then executes the loaded program instructions 217 to model packet traffic transmitted and/or received in real-time by communications device 219 and/or to model pre-stored packet traffic information, such as previously transmitted or received traffic, test traffic patterns, traffic to be transmitted in the future, and the like. Thus, processor 203 operates under the control of the instructions 217 to perform example methods, as will be described in more detail below.

The ability to model traffic in terms of LB parameters can offer several potential uses. Some of these uses will now be described, in reference to the example network and system arrangement illustrated in FIGS. 1 and 2. It should be noted that the example embodiments of the invention are not limited by the uses described herein; rather the description is for illustrative purposes only. In particular, one skilled in the art will recognize in view of this description that the example embodiments of the invention can be applied in other environments and uses than those shown and described herein.

As described above, the download and upload rates for a user's information appliance, such as for example, information appliance 107b in FIG. 1, is typically limited to a maximum rate selected by the user from among different levels of service offered by the provider. The maximum rate is specified in a service level agreement (SLA) between the user and the service provider.

From the user's point of view, selecting an appropriate level of service can often be difficult. For example, a user considering service via a SLA that is LB-based might want maximum service, i.e., his/her traffic rate is not limited by the LB, at a minimum cost. However, if the user does not know the characteristics of his/her traffic in terms of LB parameters, the user will have difficulty determining how the different levels of service offered by the provider will limit his/her traffic. As a result, the user might not be able to select the lowest (and cheapest) level of service for which his/her traffic will not be limited.

In this case, for example, and according to at least one example embodiment of the invention to be described in more detail below, the user can choose to model pre-stored information that is representative of the user's typical packet traffic. The pre-stored information can be, for example, information about packet traffic between the user and a previous service provider, information about packet traffic that the user expects to send/receive in the future, and the like. In this way, the user can more easily and accurately select an appropriate level of service.

Also according to at least one example embodiment of the invention to be described below, once the user enters a SLA with the service provider, the user can monitor his/her packet traffic in real-time, for example, to ensure that the level of service continues to meet the user's needs, and can adjust the level of service if the characteristics of his/her traffic change over time.

Similarly, according to at least one example embodiment of the invention to be described below, the service provider can analyze a potential customer's packet traffic and provide recommendations for choosing an appropriate level of service among the standard levels offered, or tailor an individual SLA to meet the potential customer's specific needs. In addition, the service provider can monitor a current customer's traffic, and provide updated recommendations or retailored SLAs as the customer's traffic changes over time. These services offered by the provider can be offered free of charge, or can be offered as an option for an additional charge to the customer.

The service provider can implement one or more example embodiments of the invention for other uses as well. For example, the service provider might want to allocate bandwidth for a communication line, such as communication line 103a in FIG. 1, which is, for example, a trunk between two points in the network, such as nodes 101a and 101b. In this case, for example, a procedure according to at least one example embodiment of the invention can be implemented at node 101a and/or node 101b as computer-executable program instructions 217 to model packet traffic across communication line 103a. Sampling typical traffic over a period of time, and modeling the traffic in terms of LB parameters, can allow for more appropriate specification of the trunk.

Additionally, an accurate characterization of packet traffic in terms of LB parameters can be provided. In particular, when a procedure according to at least one example embodiment of the invention is implemented to model pre-stored packet traffic information, the entirety of the pre-stored content can be accurately characterized. This can be useful, for example, to characterize a bursty video stream, so that an appropriate SLA can be established to support its transport.

Having described various uses of modeling packet traffic in terms of LB parameters according to one or more example embodiments of the invention, example embodiments of the invention will now be described in greater detail.

Example Embodiment for Generating LB Parameters Based on Packet Conformance

Figure 3A:
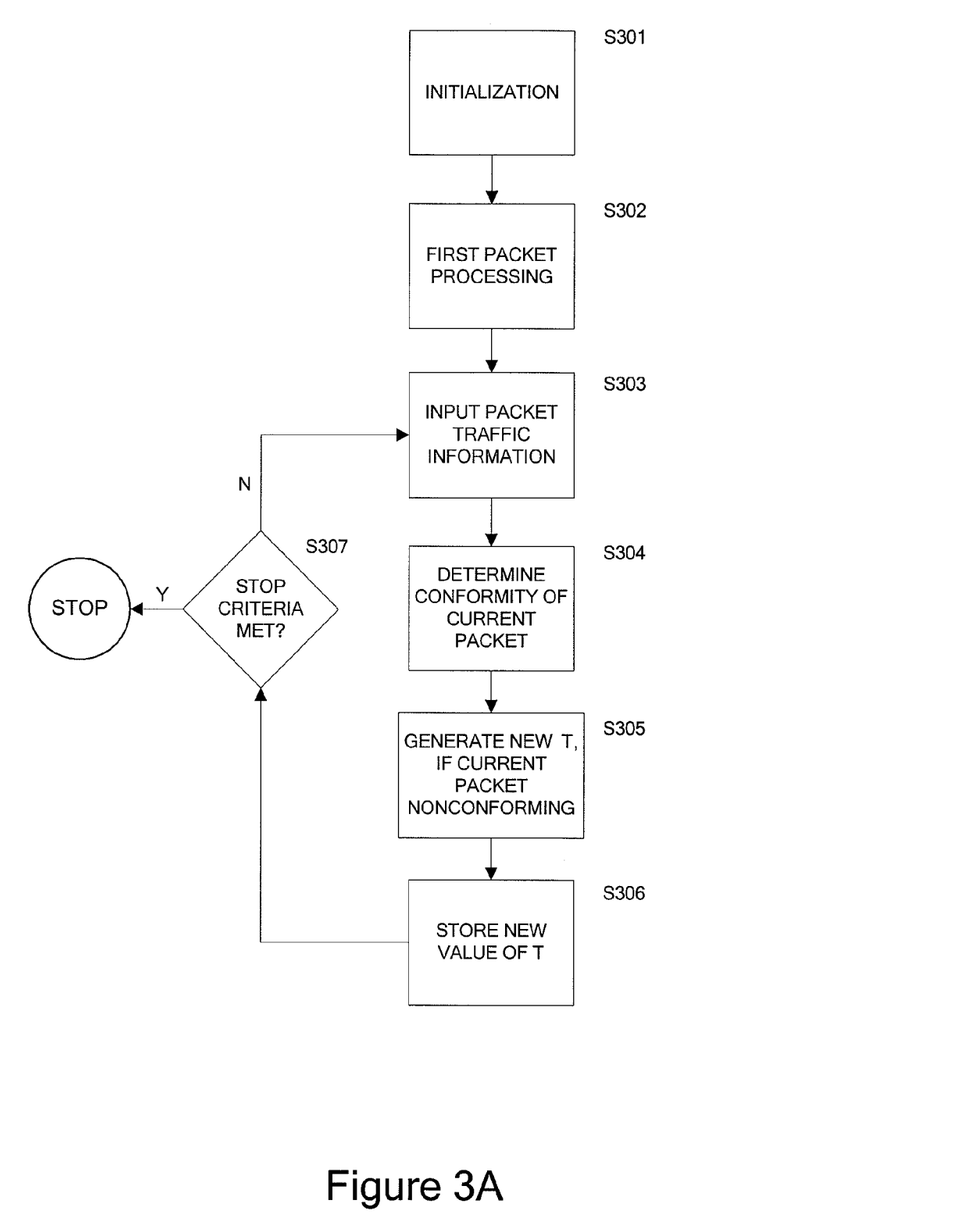
FIG. 3A is a flowchart of an example method for modeling packet traffic according to an example embodiment of the invention.

FIG. 3A is a flowchart of a method for modeling packet traffic according to one example embodiment of the invention, in which current LB parameters are used to determine conformance of a current packet, and a determination of nonconformance causes the generation of new LB parameters (e.g., T). This method can be performed, for example, in data processing system 200 by executing program instructions 217 that cause processor 203 to perform operations according to the method.

Referring to the example environment discussed above, for example, information appliance 107a is a PC having the architecture of data processing system 200. A user of information appliance 107a pays for network services under a SLA with a network service provider that operates a network comprising nodes 101a to 101c and communication lines 103a and 103b. More specifically, the user pays for a maximum data rate and a maximum burst size for downloads to information appliance 107a. The network service provider provides the user with network service by restricting data downloads to information appliance 107a to the paid for maximum data rate and maximum burst size using a LB having parameters set to appropriate values, depending on the type of LB used. In the present example embodiment, for example, the network service provider uses a modified version of F-GCRA, or "Modified F-GCRA." However, the example embodiments of the invention are not limited to modeling packet traffic in terms of Modified F-GCRA parameters. Rather, packet traffic can be modeled in terms of the parameters of other LBs as well.

Table 1 lists terms and definitions relating to Modified F-GCRA, and Table 2 provides a summary of the operation of Modified F-GCRA.

TABLE 1

List of Modified F-GCRA Terms and Definitions

State variable = X(t), which reflects previous packet arrivals (increases to LB) and leakage time (decreases to LB) through time t. Units = seconds (units could equivalently be in bytes, using T for conversion).
Target inter-arrival interval = T (units = seconds/byte)
Tolerance = L (seconds) NOTE: units are the same as for X(t)
Packet j arrives at time $t_j$, and has length $N_j$ (bytes).
Arrival state of a packet = X'. Equal to the LB state when the packet arrives, but before the state is updated with the length of that new packet, except that if X' < 0 then the LB state is 0 by definition. For conformance X' must be $\leq$L.

NOTE:
$X_j$ is also used to represent $X(t_j)$, and $X'_j$ is also used to represent X' at time $t_j$.

TABLE 2

Summary of the Modified F-GCRA operation

Initialization: packet 0 arrives at $t_0$ (= 0 for simplicity), $X_0'$ = 0, and $X_0$ = $N_0$T. Packet 0 is by definition conforming.
Algorithm: (for packets 1, 2, ...)
Upon arrival of packet j at time $t_j$, compute $X'_j = X_{j-1} - (t_j - t_{j-1})$, in other words $X'_j$ is equal to $X_{j-1}$ minus the amount of leakage since time $t_{j-1}$.
Test if $X'_j \leq$L or not. If not, packet j is non-conforming. Ignore it and do not update state X. It is as if packet j did not exist. The next packet will be packet j again.
If $X'_j \leq$L, then packet j is conforming. Update state as $X_j$ = max(0, $X'_j$) + $N_j$T.

NOTE 1:
to account for the "filling" of the LB with a conforming packet j, the LB state is increased inversely proportional to the LB rate (proportional to T). In this approach, the LB accounts for "leaking" by decreasing the LB state at a constant rate of one unitper unit time. However, other approaches can be used to account for "filling" and "leaking." For example, in another approach the LB state is increased independent of the LB rate, and the LB state leaks at a constant rate of "LB rate" units per unit time, i.e. the LB state isdecreased slower or faster depending on the rate of the LB. In view of the description below, one skilled in the art will readily recognize how the example embodiments of the invention can be applied using any approach to accounting for increases and decreases in LB state.
NOTE 2:
the conformance of packet j is not a function of the length of packet j, but rather of the arrival time of packet j and the lengths of the previous packets. Other forms of LBs base conformance of packet j at least in part on the length of packet j. In view of thedescription below, one skilled in the art will readily recognize how the example embodiments of the invention can be applied to model traffic in terms of parameters of other LBs.
Notation: the interval between arrival of packets j and j + 1 is also referred to as $\Delta_j$, i.e. $\Delta_j$ = $t_{j+1} - t_j$.

In this example environment, therefore, the service provider would set the LB's value of T equal to the inverse of the maximum rate defined in the SLA, and would set the LB's value of L equal to the maximum burst size value defined in the SLA. However, if the user does not know the characteristics of his/her packet traffic, i.e., does not know how much service the traffic demands, the user might not know whether the values of T and L are appropriate. In other words, without an accurate model of his/her packet traffic, a user will likely pay for either too much service or too little service.

In this regard, the user can execute program instructions 217 to model the user's packet traffic received over the network service provider's network via communications device 219, in terms of the LB parameters for the type of LB used by the network service provider, in accordance with the present example embodiment of the invention as will be described below. In this way, for example, the user can determine if the maximum download rate and the maximum burst size in the SLA are appropriate for his/her traffic, since the program models the user's traffic in the similar terms as the SLA, i.e., LB parameters.

Referring now to FIG. 3A, the method executed by program instructions 217 will now be described. When the program is first executed in response to, for example, the user operating appliance 107a to cause the program instructions 217 to be executed, the processor 203 performs initialization (S301) by storing initial values of LB parameters, T and L, in memory 205. The initial values of T and L may be predefined and pre-stored in storage device 211 as data 215, for example, or the user may input the initial values when the program is first executed in response to a prompt. The process then waits for a first packet to be received at communications device 219 from the network service provider's network. For example, this may occur as a result of the user operating the appliance 107a to request a download of a file from a resource on the network.

When a first packet arrives, processor 203 performs first packet processing (S302) by defining the first packet as conforming (regardless of the particular properties of the packet), and recording information about the packet, such as packet arrival time and packet length, into memory 205. When each subsequent packet is received, processor 203 defines the packet as the current packet and records (S303) information about the current packet, such as packet arrival time and packet length, into memory 205. Processor 203 determines (S304) whether the current LB parameter T is sufficiently small to make the current packet conformant to the LB, based on the packet arrival time and/or the packet length of the current packet, as well as the packet arrival times and/or packet lengths of preceding packets and current LB parameter L, which are also stored in memory 205.

For example, to determine the conformance of the current packet in the present example, which models traffic in terms of a Modified F-GCRA, processor 203 calculates the arrival state (X') of the current packet, which is a function of the current value of T and the arrival times and packet lengths of the preceding packets, and compares the arrival state to the current value of L. If X'>L, the current packet would be nonconforming to the LB for the current value of T. If X'$\leq$L, the packet is conforming to the LB for the current value of T.

In one example embodiment, the initial value of T is set to be very high, such that the second packet to arrive will be guaranteed to be nonconforming for that T, and thus will require a new value of T to be generated.

If the current packet is determined to be nonconforming for the current T, a new T is generated (S305) for which the current packet is conforming. For example, according to one example embodiment of the invention, processor 203 can calculate T by a "brute-force" approach, in which the new T is estimated via a search algorithm conducted over the set of all preceding packets, or over an initial subset of the preceding packets. Processor 203 calculates an estimate for the new T, for example, by reducing the current value of T by a predetermined amount, which may be, for example, a fixed value or percentage, or may be a function of, for example, the current value of T or the value of the arrival state of the current packet. Processor 203 runs a search, during which the estimated value of T would be tested against the set of preceding packets. In the present example based on a Modified F-GCRA, processor 203 recomputes the X' of the current packet based on the estimated T, and compares the value of the recomputed X' to L. If the current packet is conforming for the current estimate of T, and the difference between the recomputed X' and L is within a predetermined level of accuracy, the current estimate of T is set as the new T. Otherwise, the processor 203 modifies the current estimate of T and iterates the process.

The new value of T is stored (S306) in memory 205. The process proceeds to S307 to determine whether a stop criterion has been met. For example, the process could be set to end after a predetermined number of packets have arrived, after a predetermined time period has elapsed, etc. If the stop criterion is met at S307, the process ends. Otherwise, the process proceeds to S303 to await the arrival of a next packet, and the new value of T is used as the current T upon the arrival of the next packet.

Figure 3B:
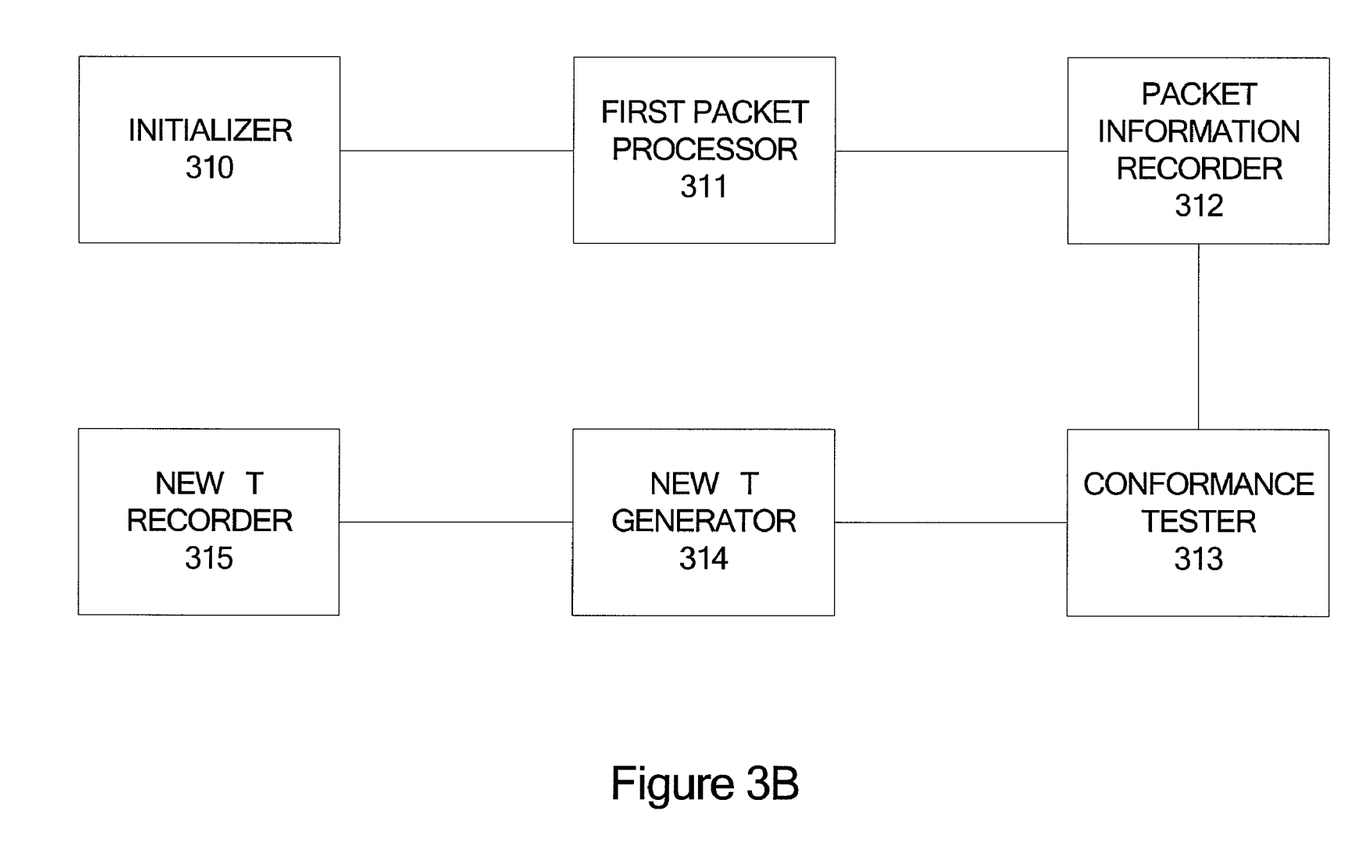
FIG. 3B is a collaboration diagram for functional modules for modeling packet traffic according to an example embodiment of the invention.

Having described the sequence of operations within information appliance 107a, specific functional modules implementing the above-described operations from FIG. 3A will now be described. FIG. 3B is a collaboration diagram for functional modules deployed in information appliance 107a, for modeling packet traffic in terms of LB parameters in accordance with an example embodiment of the invention. The functional modules can be implemented as software modules or objects. In other example embodiments, the functional modules may be implemented using hardware modules or other types of circuitry, or a combination of software and hardware modules. For example, the functional modules can be implemented via processor 203 described above.

In operation, an initializer 310 stores initial values of LB parameters, T and L, and waits for a first packet to be received from the network service provider's network. When a first packet arrives, a first packet processor 311 defines the first packet as conforming and records information about the packet, such as packet arrival time and packet length. When each subsequent packet is received, a packet information recorder 312 records information about the current packet, such as packet arrival time and packet length. A conformance tester 313 determines whether the current packet would conform to a LB defined in terms of the current LB parameters T and L, according to the method described above.

If the current packet is determined to be nonconforming for the current value of T, a new T generator 314 generates a new T for which the current packet is conforming, according to the method described above. A new T recorder 315 stores the value of the new T.

In the method of the present example embodiment, packet traffic is modeled in real-time. In this case, the arrival of a packet is used to trigger the determination of whether the current T is sufficiently small to achieve conformance of the newly-arrived packet, and generation and storage of a new T (if the newly-arrived packet is nonconforming for the old T). The method can be set to terminate when all packets in a finite set have arrived. For example, the user can input stopping criteria, instructing the processor 203 to stop after a set period of time has elapsed, to stop at a set time, to stop after processing a set number of packets, or to stop according to some other predetermined criteria. The value of T at any point in time is optimal given the packets that have arrived, and is an upper bound on the final value of T produced by the method. The value of T at the conclusion of the method is optimal for the entire data set, within the limits of numerical precision.

The method can also be used to model pre-stored packet traffic information. One skilled in the art will readily recognize, in view of this description, how the example embodiments of the invention can be applied to model pre-stored packet traffic information, for example, by applying the same methods described herein to pre-stored data. In one example embodiment, the pre-stored packet data includes an indication of when each packet would arrive at the LB, relative to the arrival time of packet 0. Those arrival times could be stored, for example, either directly relative to $t_0$, i.e. $(t_j-t_0)$, or relative to the preceding packet, i.e. $(t_j-t_{j-1})$.

A. Modifications Based on Leaky Bucket Characteristics

Other example aspects of the invention will now be described. In particular, the inventor has recognized that certain characteristics of LBs can be exploited in modeling packet traffic in terms of LB parameters, for example, to increase computational efficiency and decrease data storage requirements. A description of these characteristics of LBs will now be provided, and then examples will be described of how these characteristics can be exploited as modifications to or enhancements of the example embodiment described above.

It is noted that, while the description is primarily directed to "leak downward" types of LBs, the example embodiments of the invention also can be used to model packet traffic in terms of the parameters of any type of LB. In particular, in view of the description below, one skilled in the art will readily recognize that other types of LBs have characteristics corresponding to those described below, and which can be similarly exploited.

B. Characteristics of Leaky Buckets

A first characteristic of LBs is that the value of $X_i'$ (arrival state) associated with a given packet i (with arrival time $t_i$) is a nondecreasing function of the interval T. Furthermore, if $X_j'>X_{j+1}'$ and $X_j'>0$ for a given packet j and a given value of T, then for any more aggressive T for which $X_j'>0$ the relation $X_j'>X_{j+1}'$ continues to hold.

A second characteristic relates to the definition of conformance. In particular, it is known that if all the packets in a set {packet$_j$, j=0, 1, 2, . . . } conform to an LB, then it must be true that $X_j' \leq L$ for all j. The largest T for which this is true satisfies $X_j'=L$ for at least one value of j. This is true because if $X_j'<L$ for all j, then a larger T could be found for which all packets are still conforming. It is noted that if t is a continuous variable, or is defined with sufficient precision, it is unlikely that $X_j'=L$ for more than one value of j. However, the example embodiments of the invention that exploit this characteristic of LBs work equally well if $X_j'=L$ for exactly one value of j or for more than one value of j.

A third characteristic of LBs flows from the fact that the LB algorithm is concerned with relative time, not absolute time, and more specifically is concerned with inter-arrival intervals $\Delta$. For a given set of packet lengths and arrival intervals, the maximum T for which all packets in the set are conforming is a function of some subset of one or more consecutive packets (lengths $N_j$ and arrival intervals $\Delta_j$). Packets not in the subset do not affect the value T (except that by definition, the arrival interval of the last packet in the subset is a function of the arrival time of the first packet beyond the subset).

For example, given arrival times $t_0$ and $t_2$ of packets 0 and 2, and packet lengths $N_0$ and $N_1$ of packets 0 and 1, then the arrival time $t_1$ determines intervals $\Delta_0=(t_1-t_0)$ and $\Delta_1=(t_2-t_1)$. Intuitively, if $t_1$ is close enough to then T is a function only of $N_0$ and the interval $\Delta_0$. In that case, the subset is just packet 0 (i.e., the length $N_0$ and the associated interval $\Delta_0$ following packet 0) and T is chosen to make $X_1'=L(X_2' \leq L)$. On the other hand, if arrival time $t_1$ is close enough to $t_2$ then T is a function only of $N_1$ and the interval $\Delta_1$. In that case, the subset is just packet 1 (i.e., the length $N_1$ and the associated interval $\Delta_1$ following packet 1) and T is chosen to make $X_2'=L$, while $X_1' \leq 0$ (i.e., at $t_1$ the LB has leaked all the data from packet 0). But, if arrival time $t_1$ is in a certain region not especially close to either $t_0$ or $t_2$, T is a function of the sum $(N_0+N_1)$ and of the interval $\Delta_0+\Delta_1=(t_2-t_0)$. In that case the subset is both packets 0 and 1, and T is chosen to make $X_2'=L$, while $0<X_1' \leq L$ (i.e., at $t_1$ the LB has not yet leaked all the data from packet 0, but it has leaked enough that packet 0 alone does not constrain T). In general, the constraining subset consists of one or more consecutive packets, and T is a function of the sum of their packet lengths and of the interval from the arrival of the first packet in the subset to the arrival of the first packet beyond the subset.

C. Exploiting the Characteristics of Leaky Buckets

The foregoing characteristics can be exploited in various ways in modeling packet traffic. Examples of how the characteristics can be exploited will now be described as modifications to and/or enhancements of the example embodiment described above in relation to FIG. 3A.

I. Definitions

First, it is helpful to define two new terms. An "epoch" is defined as a set of one or more consecutive packets (either physical packets, or meta-packets (defined below)) with the following characteristics: 1) the first packet is such that $X' \leq 0$ at its arrival time, and 2) the last packet is such that either it is the most recent to arrive or the next packet following is the first packet of the following epoch. If the last packet of the epoch is the most recent to arrive, then the epoch is the "current epoch."

A "meta-packet" is defined as a virtual entity that represents one or more consecutive physical packets. The length of a meta-packet is the sum of the lengths of the packets that it represents. The arrival time of a meta-packet is the earliest arrival time of the packets it represents. $M_j$ denotes the length of meta-packet j, and $m_j$ represents the arrival time of meta-packet j. For example, if packets 0, 1, and 2 are represented by meta-packet j, then $M_j = N_0 + N_1 + N_2$ and $m_j = t_0$. It is noted that the term "packet" as used herein can refer to either a physical packet or a meta-packet.

II. Modifications and Enhancements

Some modifications and/or enhancements will now be described. However, in view of the foregoing description of the characteristics of LBs, and in view of the following description, one skilled in the art will readily recognize that other modifications and/or enhancements can be made.

a) Basing Generation of New T on Current Epoch

When it is determined that the current value of T is insufficiently aggressive to define the most recently arrived packet as conforming (e.g., at S304 of FIG. 3A), a new value of T is computed (e.g., S305). In light of the above characteristics, generation of the new T depends solely on the packets in the current epoch. Specifically, since the X' value associated with the packet that begins the current epoch will still be $\leq 0$ when recomputed for the new T, no earlier packet is of consequence in determining the new T. Therefore, one way to exploit this characteristic of LBs is to modify the generation of the new T so that the generation considers only packets in the current epoch, which can be useful in decreasing computation burden. Another way to exploit this characteristic is to discard information about packets arriving earlier than the current epoch, which can be useful in terms of memory savings and decreased computational burden. In one example embodiment, discarding the information is accomplished by releasing the portions of memory in which the information is stored, thus allowing the information to be overwritten if needed. However, discarding the information can also be accomplished by performing an actual deletion of the information from memory.

b) Redefining the Current Epoch

As computed using the new T, the value of X' associated with each packet in the current epoch will be less than or equal to its value as computed using the old T. By definition, for a packet that is not the first packet of the current epoch, the X' value computed using the old T is greater than zero. However, it is possible that for one or more such packets, the X' value computed using the new T will be $\leq 0$. In one modification to the generation of the new T, the current epoch is redefined to begin at the latest such packet. Otherwise, the set of packets that make up the current epoch remains unchanged. Since the redefined epoch contains fewer packets than the old epoch, the modification can provide additional memory savings and reduction in computational burden.

More specifically, it is noted that in every case, the current epoch is the set of packets such that the oldest packet has $X' \leq 0$, and all subsequent packets (if any) have $X' > 0$. If the current epoch is redefined as a result of the new T, then T is recomputed again based on the redefined current epoch. In other words, whenever an arrival of a packet indicates that the T estimate is insufficiently aggressive, an iterative loop is entered. During the iterative loop, the largest more aggressive T for which the newly arrived packet and all previous packets in the current epoch are conforming is computed. Then all the X' within the current epoch are recomputed and it is determined whether the current epoch needs to be redefined. If so, the process is iterated, computing a still more aggressive T, and so on. The iteration is stopped when the new T does not result in a redefined current epoch. At that point, the process waits for the next packet to arrive, and processes that next packet when it arrives.

The iteration of redefining the epoch and recomputing T based on the redefined epoch can be carried out in at least two ways, and the choice is an implementation design decision, i.e., the end result is the same either way. When a new T is computed, one choice is that all the X' within the current epoch are recomputed (in any order). The most recent X' (i.e., the X' with the highest index) that has been driven less than or equal to zero becomes the starting point of the redefined current epoch. Another choice is that the X' are recomputed in order, from the start of the current epoch, and as soon as one of them is found to have been driven less than or equal to zero the current epoch is redefined with this new starting point. Depending on the data in the set, and also on the relative computational burden of computing X' compared to computing a new T, one or the other approach will be less complex.

In addition, when a new T must be computed, the largest value that the new T can have is equal to (L plus the time span of the current epoch) divided by (the sum of the packet lengths within the current epoch, excluding the length of the most recent packet). That value of T allows just enough leakage to bring X' to L at the end of the current epoch, provided that the LB leaks all the time, i.e., $X' \geq 0$ for all times within the current epoch. If the new T causes X' to become less than zero within the current epoch, there is a non-zero interval of time when the LB is empty (not leaking), which means the total leakage of the current epoch will not be enough to bring X' to L, i.e., the new T is also insufficiently aggressive to make the most recently arrived packet conforming. But, according to the definition of epoch, such an event causes the current epoch to be redefined. As noted above, each redefinition of the current epoch is accompanied by the computation of a new T, according to the above formula.

Thus, another useful aspect of redefining the current epoch and recalculating T based on the redefined epoch is that the generation of the new T can rely on precise formulas, rather than a search algorithm, such as the "brute force" method described above. Therefore, the accuracy and computational efficiency of the method can be increased in most, if not all, cases.

In the unlikely case that a new T causes X' to be exactly equal to 0 for an instant of time within the current epoch, then according to the definition of epoch, this event causes the current epoch to be redefined. However, if X' is never less than zero then the LB never stops leaking, so the new T computed with the redefinition of the current epoch will be the same as that computed with the previous definition of the current epoch. In other words, while the value of T will not change in this case, the epoch will be redefined as a smaller set of packets.

c) Consolidating Packets into a Meta-packet

Under most conditions information about multiple packets can be consolidated into a meta-packet, and the meta-packet information can be stored and used for computations. This consolidation can dramatically decrease the storage and computation requirements of the algorithm, depending on the specific packet sequence. In particular, if for two consecutive arrival times within the current epoch $X_j' \geq X_{j+1}'$, then packet j−1 and packet j can be combined in a meta-packet. This can be done because packet j only matters individually if $X_j'$, which (if positive) is the LB state at the end of inter-arrival interval $\Delta_{j-1}$ (i.e., at time $t_j$), can potentially mark the start of a redefined current epoch. But, when $X_j' \geq X_{j+1}'$, then any new T sufficient to drive $X_j' \leq 0$ will also drive $X_{j+1}' \leq 0$, so $t_j$ cannot mark the start of a redefined current epoch. In one modification, the method stores only meta-packet information (recalling that a meta-packet can represent a single physical packet), rather than storing individual physical packet information, and takes advantage of all meta-packet consolidation opportunities afforded by the specific packet sequence. In light of the foregoing definition of a meta-packet, it can be seen that consolidating, for example, two packets into one meta-packet, the number of data values required to be stored is decreased by half (i.e., from four to two). That is, two packet length values and two packet arrival time values are consolidated into one meta-packet length value and one meta-packet arrival time value. Of course, a meta-packet can also be formed by consolidating two meta-packets, or by consolidating one meta-packet and a physical packet. Thus, additional memory savings and reduction in computational burden can be realized. Similar to discarding packet information of packets preceding the current epoch, the packet information of individual packets that have been consolidated into a meta-packet can be discarded by releasing the portions of memory in which the individual packet information is stored, thus allowing the information to be overwritten if needed. However, discarding the information can also be accomplished by performing an actual deletion of the information from memory.

Example Embodiment that Exploits LB Characteristics to Generate LB Parameters

Figure 4A:
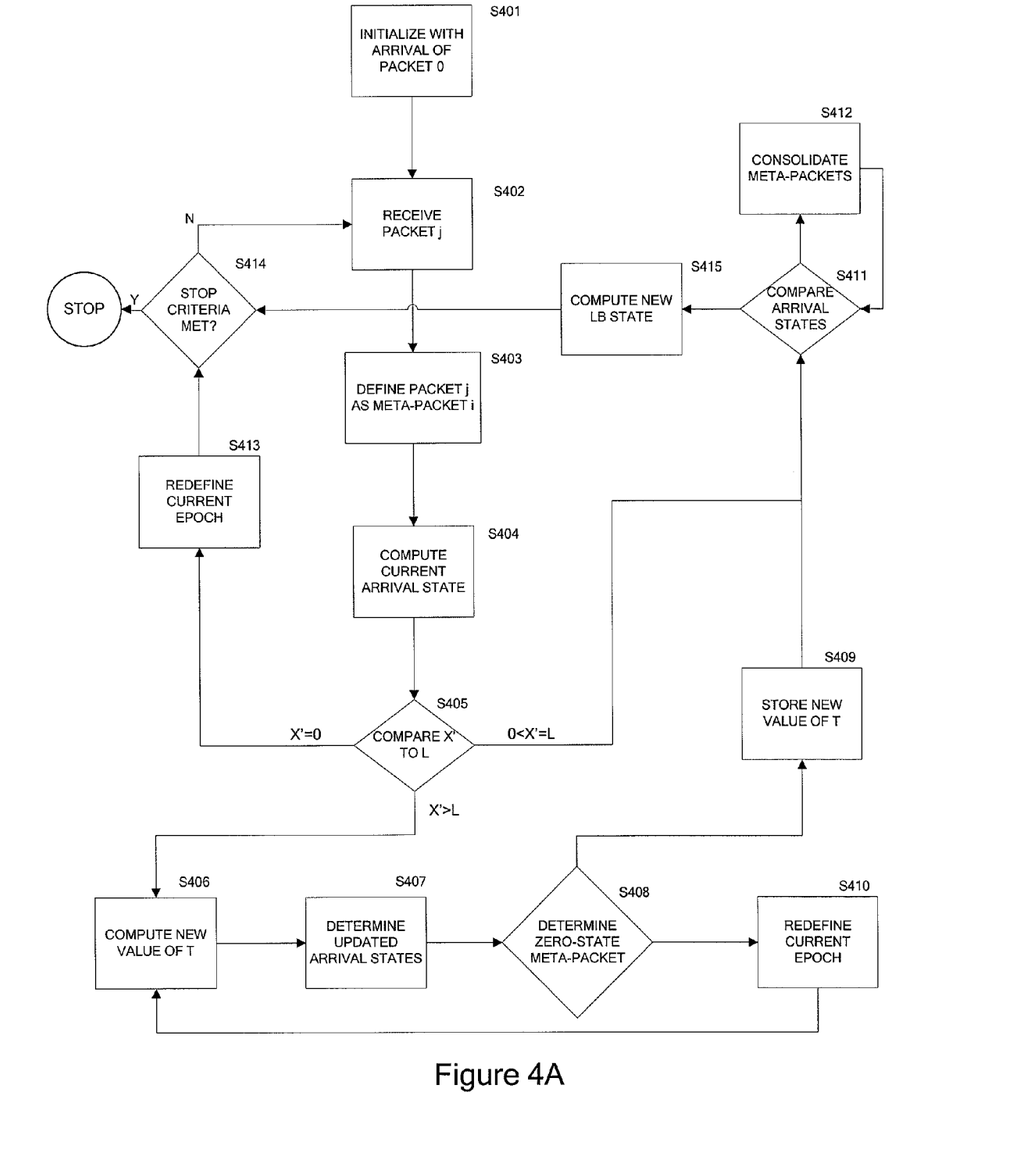
FIG. 4A is a flowchart of a modified and/or enhanced method for modeling packet traffic according to an example embodiment of the invention.

FIG. 4A is a flowchart of an example process of modeling packet traffic according to another example embodiment of the invention, which makes use of the foregoing characteristics of LBs. The method of the present example embodiment can be implemented, for example, in information appliance 107a as a modified or enhanced version of program instructions 217. Processor 203 executes the modified program instructions 217, stores various values in memory 205, and performs other operations according to the method of the present example embodiment in a similar manner as described above. Accordingly, the operational details of information appliance 107a will not be included in the description of the method of the present example embodiment.

Referring to FIG. 4A, the process begins with initialization (S401) upon the arrival of packet 0 at time t0. Specifically, T is initialized to +∞, or a number sufficiently large so that packet 1 will not conform for the initial T. Packet 0 is defined as meta-packet 0, the time at which the current epoch begins ($m_0$) is set equal to $t_0$, and the length of the first meta-packet of the initial epoch ($M_0$) is set equal to $N_0$. The state of the LB is initialized such that $X_0'=0$, and $X_0=M_0*T$ (or to +∞ if T=+∞). The process then waits for arrival of subsequent packets.

After initialization at S401, packets are received and processed according to the following manner. A currently arriving packet j is received (S402) at time $t_j$. The current packet j is defined (S403) as meta-packet i, by setting $m_i=t_j$ and $M_i=N_j$, where the previous meta-packet has index i−1, and where the current epoch starts with meta-packet 0. It is noted that the values of the physical packet and meta-packet indices j and i are generally different.

The current arrival state is computed (S404) as $X_i'=X_{i-1}-(m_i-m_{i-1})$. The current arrival state is compared (S405) to tolerance L. If ($X_i'>L$), a more aggressive T is computed (S406) as an estimated new T:

$$\text{estimated new } T = \frac{L + m_i - m_0}{\sum_{k=0}^{i-1} M_k} \quad (1)$$

and the process proceeds to S407. At S407, updated arrival states X' are determined for meta-packets in the current epoch based on the estimated new T. The arrival state of meta-packet 0 is not affected by the estimated new T, and thus, $X_0'$ remains less than or equal to 0. The updated arrival state of meta-packet i is already known to be L, since the estimated new T is computed to drive $X_i'$ to equal L. Therefore, computation is necessary only when determining the updated arrival states for meta-packets other than meta-packet 0 and meta-packet i, if any. At S408, the most recent meta-packet having an updated arrival state less than or equal to zero is determined, and the process also determines if this meta-packet is meta-packet 0 (the meta-packet beginning the current epoch).

If the meta-packet determined in S408 is meta-packet 0, the estimated new T is stored (S409) as the new T, and the process proceeds to S411 to check for the possibility of combining meta-packets. If the meta-packet determined in S408 is not meta-packet 0, the current epoch is redefined (S410) to begin with the meta-packet determined in S408, and the portion of memory storing meta-packet information of meta-packets preceding this meta-packet is released. The process returns to S406 where a new more aggressive T is computed based on the redefined epoch.

Referring again to S405, if $0<X_i'\leq L$, the current packet is conforming for the current value of T, and T is not changed. In this case, the process proceeds to S411, where $X_i'$ is compared with $X_{i-1}'$.

It is noted that, for the purpose of clarity in the present description, as the current epoch is redefined and as meta-packets are consolidated, meta-packet 0 always refers to the first meta-packet in the epoch and meta-packet i always refers to the most recent meta-packet in the epoch. This convention for the meta-packet index is merely for clarity in the present description, and is not meant to suggest or imply a particular indexing convention in an actual implementation of the example embodiments of the invention.

If $X_i' \leq X_{i-1}'$ at S411, then meta-packets i−2 and i−1 are consolidated (S412). The arrival time of the consolidated meta-packet is equal to $m_{i-2}$ and the length is equal to $M_{i-2}+M_{i-1}$. Following the terminology convention, this consolidated meta-packet, which is the penultimate meta-packet in the current epoch, is referred to as meta-packet i−1. The newly-consolidated meta-packet information is stored in memory, and the portion of memory storing meta-packet information of the old meta-packets i−2 and i−1 is released.

Control passes back to S411 where the arrival states of the final two meta-packets of the current epoch are compared.

At S411, if $X_i' > X_{i-1}'$, then meta-packets are not consolidated. The process proceeds to S415 to compute the LB state as $X_i = X_i' + M_i*T$. The process then proceeds to S414 to determine whether a stop criterion has been met. For example, the process could be set to end after a predetermined number of packets have arrived, after a predetermined time period has elapsed, etc. If the stop criterion is met at S414, the process ends. Otherwise, the process proceeds to S402 to await arrival of the next packet.

If at S405 $X_i' \leq 0$, the process redefines (S413) the current epoch to consist only of the most recent meta-packet. Following the terminology convention, this meta-packet is referred to as meta-packet 0, with length $M_0$. The LB state is computed as $X_0 = M_0*T$. The process then proceeds to S414 to determine whether a stop criterion has been met.

Figure 4B:
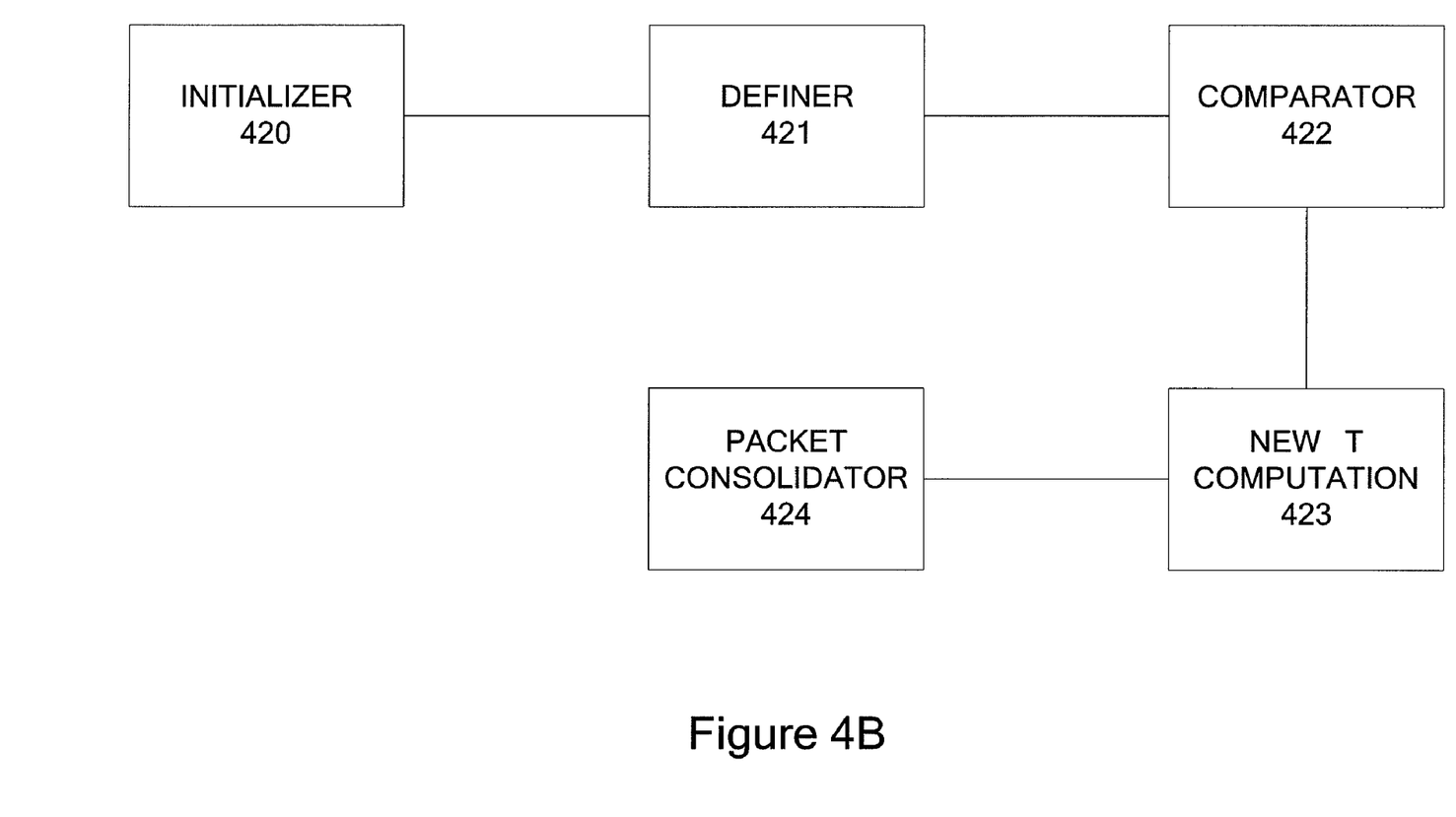
FIG. 4B is a collaboration diagram for functional modules for modeling packet traffic according to a modified and/or enhanced method for modeling packet traffic according to an example embodiment of the invention.

Specific functional modules implementing the above-described operations from FIG. 4A will now be described. FIG. 4B is a collaboration diagram for functional modules deployed in information appliance 107a, for modeling packet traffic in terms of LB parameters in accordance with the example embodiment of the modified method of the invention. The functional modules can be implemented as software modules or objects. In other example embodiments, the functional modules may be implemented using hardware modules or other types of circuitry, or a combination of software and hardware modules. For example, the functional modules can be implemented via processor 203 described above, in relation to the example embodiment of the modified method.

In operation, an initializer 420 performs initialization with the arrival of packet 0 at $t_0$. Specifically, initializer 420 initializes T to $+\infty$, or a number sufficiently large so that packet 1 will not conform to the LB for that T, defines packet 0 as meta-packet 0, sets the time at which the current epoch begins ($m_0$) equal to, and sets the length of the first meta-packet of the initial epoch ($M_0$) equal to $N_0$. Initializer 420 initializes the state of the LB such that $X_0 = M_0*T$ (or to $+\infty$ if $T = +\infty$). Initializer 420 then causes information appliance 107a to enter a waiting mode to wait for arrival of subsequent packets.

Packets are then received and processed by the following functional modules. A definer 421 receives a currently arriving packet j at time $t_j$, and defines the current packet j as meta-packet i, by setting $m_i = t_j$ and $M_i = N_j$, where the previous meta-packet has index i−1, and where the current epoch starts with meta-packet 0. Definer 421 also computes the current arrival state as $X_i' = X_{i-1} + (m_i - m_{i-1})$. A comparator 422 compares the current arrival state to tolerance L. If ($X_i' > L$), a more aggressive T is computed by a new T computation at module 423 and stored in accordance with the method described above. A packet consolidator 424 consolidates packets into meta-packets and stores the meta-packet information in accordance with the method described above.

Comparison of Modified and/or Enhanced Method with "Brute Force" Method

In comparison to a method that includes some or all of the foregoing modifications and/or enhancements, a brute-force technique would likely suffer from at least three limitations: significant computation burden; significant data storage requirements; and results that are merely estimates of optimal T, represented by a range of values between an upper bound and a lower bound. Depending on how the search is conducted, there may also be a significant delay before the estimate of T is produced.

Regarding computational burden, the brute-force technique would process the entire data set at each iteration of the search. The brute-force technique might operate in one of two ways: waiting to perform the search until all the packets in the flow have arrived (the delayed search approach); or conducting a search upon the arrival of each new packet (the packet-by-packet search approach). Comparing these two search options, the delayed search approach would require less computation, but would incur more delay in producing a T estimate than the packet-by-packet search approach. One reason for the increased computation requirements of the brute-force search technique is that each iteration of the search (whether the search itself is performed only once after all packets are received or is performed upon the arrival of each packet) requires computation over the entire set of packets received (thus far). The number of iterations of the search is a function of the data and of the desired precision of the estimate.

Regarding data storage requirements, the brute-force technique would require that the entire data set be stored, e.g., each packet arrival time and packet length.

Finally, the precision of the result produced by the brute-force technique would be a design trade-off. More precise results require more extensive searching, and thus more computation.

Other Example Embodiments

The foregoing example embodiments are directed to determining T. However, in another example embodiment of the invention, both T and L can be generated such that a predetermined cost function is optimized. For example, "cost" can be considered directly proportional to L and inversely proportional to T. Therefore, a cost function (C) is constructed: $C = (1/T) + alpha*L$, where alpha is a design variable that allows the relative costs of T and L to be traded off. An optimal (T,L) pair (as a function of alpha) can then be computed for a stream of arriving packets.

It is noted that some SLAs are written in terms of multiple LBs. For example, ATM VBR is defined in terms of a dual leaky bucket. That can be complicated because the updates of the two LBs are tied together, i.e., conformance of a cell to both LBs is required in order to update the LB associated with the lower rate. Creating an inverse LB system to model traffic in this case is not a problem because by definition all packets are conforming. So, multiple inverse LBs could be executed in parallel and derive the parameters of each independently. One may use a smaller L than the other, for example. The smaller L will result in a smaller T (more aggressive). If T,L combinations are found by optimizing a cost function, (not treated here in detail), each LB would have a different cost function.

Although this invention has been described in certain specific example embodiments, many additional modifications and variations would be apparent to those skilled in the art. It is therefore to be understood that this invention may be practiced otherwise than as specifically described. Thus, the example embodiments of the invention should be considered in all respects as illustrative and not restrictive, the scope of the invention to be determined by any claims supportable by this application and the claims' equivalents rather than the foregoing description.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method of determining Leaky Bucket parameters for modeling packet traffic, wherein the packet traffic includes a plurality of provided packets, the method comprising:
for at least one packet among the plurality of provided packets,
obtaining packet traffic information associated with the packet;
comparing the obtained packet traffic information with stored Leaky Bucket parameters;
determining, based on the comparing, whether the packet associated with the packet traffic information conforms to a Leaky Bucket defined by the stored Leaky Bucket parameters, including at least a tolerance parameter L;
if it is determined that the packet does not conform based on a value of the packet information being determined to be greater than the tolerance parameter L, modifying one or more of the Leaky Bucket parameters, without discarding the packet, to make the packet conform;
storing the one or more modified Leaky Bucket parameters in a non-transitory computer-readable storage medium;
consolidating packet information of consecutive packets of the packet traffic; and
updating the packet traffic information to include the consolidated packet information,
wherein
the Leaky Bucket parameters include the tolerance parameter L and a target packet inter-arrival interval,
the determining includes
determining, based on the obtained packet traffic information, whether the packet would be a conforming packet in the Leaky Bucket parameterized by the tolerance parameter L and the target packet inter-arrival interval, and
the modifying includes
generating, if the determining determines that the packet would not be a conforming packet, a new target packet inter-arrival interval for which the packet would be a conforming packet.

2. The method of claim 1, wherein
the packet traffic information includes packet set information of a set of one or more consecutive packets, the set including a beginning packet that is a most recent packet having an arrival state less than or equal to zero, and an ending packet that is a current packet, and
the arrival state of a respective packet corresponds to a state of the Leaky Bucket at an arrival time of the respective packet.

3. The method of claim 2, wherein the generating comprises:
generating an estimated new target inter-arrival interval based on the packet set information;
updating arrival states of packets in the set based on the estimated new target inter-arrival interval;
determining a most recent packet having an updated arrival state less than or equal to zero;
outputting the estimated new target inter-arrival interval as the new target inter-arrival interval if the most recent packet having an updated arrival state less than or equal to zero is the beginning packet of the set; and
if the most recent packet having an updated arrival state less than or equal to zero is not the beginning packet of the set, redefining the set to begin with the most recent packet having an updated arrival state less than or equal to zero.

4. The method of claim 2, further comprising:
discarding packet information of one or more packets preceding the beginning packet of the set.

5. The method of claim 1, wherein the consolidating comprises:
comparing an arrival state of the provided packet with an arrival state of a prior packet that immediately precedes the provided packet, wherein the arrival state of a respective packet corresponds to a state of the Leaky Bucket at an arrival time of the respective packet; and
consolidating the packet information of the prior packet with the packet information of a packet immediately preceding the prior packet, if an arrival state of the prior packet is greater than the arrival state of the provided packet.

6. The method of claim 1, wherein the consolidating comprises:
setting a consolidated arrival time equal to an arrival time of an earliest arriving packet of the consecutive packets; and
setting a consolidated packet length equal to a sum of packet lengths of the consecutive packets.

7. The method of claim 1, further comprising:
discarding non-consolidated packet information of the consecutive packets that were consolidated.

8. The method of claim 1, further comprising selecting a service level based on the stored one or more modified Leaky Bucket parameters.

9. An apparatus for determining Leaky Bucket parameters for modeling packet traffic, wherein the packet traffic includes a plurality of provided packets, the apparatus comprising:
an obtainer that obtains packet traffic information associated with at least one packet among the plurality of packet;
a comparer that compares the obtained packet traffic information with stored Leaky Bucket parameters, including at least a tolerance parameter L;
a determiner that, based on the comparison of the comparer, determines whether the packet associated with the packet traffic information conforms to a Leaky Bucket defined by the stored Leaky Bucket parameters;
a modifier that, if it is determined that the packet does not conform based on a value of the packet information being determined to be greater than the tolerance parameter L, modifies one or more of the Leaky Bucket parameters, without discarding the packet, to make the packet conform;
a storage unit that stores the one or more modified Leaky Bucket parameters; and
a packet consolidator that consolidates packet information of consecutive packets of the packet traffic, and updates the packet traffic information to include the consolidated packet information,
wherein
the Leaky Bucket parameters include a tolerance parameter L and a target packet inter-arrival interval, the determiner determines, based on the obtained packet traffic information, whether the packet would be a conforming packet in the Leaky Bucket parameterized by the tolerance parameter L and the target packet inter-arrival interval, and the modifier generates, if the determiner determines that the packet would not be a conforming packet, a new target packet inter-arrival interval for which the provided packet would be a conforming packet.

10. The apparatus of claim 9, wherein the packet traffic information includes packet set information of a set of one or more consecutive packets, the set including a beginning packet that is a most recent packet having an arrival state less than or equal to zero, and an ending packet that is a current packet, and the arrival state of a respective packet corresponds to a state of the Leaky Bucket at an arrival time of the respective packet.

11. The apparatus of claim 10, wherein the modifier:

generates an estimated new target inter-arrival interval based on the packet set information;

updates arrival states of packets in the set based on the estimated new target inter-arrival interval;

determines a most recent packet having an updated arrival state less than or equal to zero;

outputs the estimated new target inter-arrival interval as the new target inter-arrival interval if the most recent packet having an updated arrival state less than or equal to zero is the beginning packet of the set; and if the most recent packet having an updated arrival state less than or equal to zero is not the beginning packet of the set, redefines the set to begin with the most recent packet having an updated arrival state less than or equal to zero.

12. The apparatus of claim 9, wherein the consolidator:

compares an arrival state of the packet with an arrival state of a prior packet that immediately precedes the packet, wherein the arrival state of a respective packet corresponds to a state of the Leaky Bucket at an arrival time of the respective packet; and consolidates the packet information of the prior packet with the packet information of a packet immediately preceding the prior packet, if an arrival state of the prior packet is greater than the arrival state of the packet.

13. The apparatus of claim 9, wherein the consolidator:

sets a consolidated arrival time equal to an arrival time of an earliest arriving packet of the consecutive packets; and sets a consolidated packet length equal to a sum of packet lengths of the consecutive packets.

14. The apparatus of claim 9, further comprising a selector that selects a service level based on the stored one or more modified Leaky Bucket parameters.

15. A non-transitory computer readable storage medium having computer-executable program instructions stored thereon, for determining Leaky Bucket parameters for modeling packet traffic, wherein the packet traffic includes a plurality of provided packets, the program instructions being executable by a computer to perform the method of for each packet, obtaining packet traffic information associated with the packet;

comparing the obtained packet traffic information with stored Leaky Bucket parameters;

determining, based on the comparing, whether the packet associated with the packet traffic information conforms to a Leaky Bucket defined by the stored Leaky Bucket parameters, including at least a tolerance parameter L;

if it is determined that the packet does not conform based on a value of the packet information being determined to be greater than the tolerance parameter L, modifying one or more of the Leaky Bucket parameters, without discarding the packet, to make the packet conform;

storing the one or more modified Leaky Bucket parameters in the non-transitory computer-readable storage medium;

consolidating packet information of consecutive packets of the packet traffic; and updating the packet traffic information to include the consolidated packet information, wherein the Leaky Bucket parameters include tolerance parameter L and a target packet inter-arrival interval, the determining includes determining, based on the obtained packet traffic information, whether the packet would be a conforming packet in the Leaky Bucket parameterized by the tolerance parameter L and the target packet inter-arrival interval, and the modifying includes generating, if the determining determines that the packet would not be a conforming packet, a new target packet inter-arrival interval for which the packet would be a conforming packet.

16. The medium of claim 15, wherein the packet traffic information includes packet set information of a set of one or more consecutive packets, the set including a beginning packet that is a most recent packet having an arrival state less than or equal to zero, and an ending packet that is a current packet, and the arrival state of a respective packet corresponds to a state of the Leaky Bucket at an arrival time of the respective packet.

17. The medium of claim 16, wherein the generating comprises:

generating an estimated new target inter-arrival interval based on the packet set information;

updating arrival states of packets in the set based on the estimated new target inter-arrival interval;

determining a most recent packet having an updated arrival state less than or equal to zero;

outputting the estimated new target inter-arrival interval as the new target inter-arrival interval if the most recent packet having an updated arrival state less than or equal to zero is the beginning packet of the set; and redefining the set to begin with the most recent packet having an updated arrival state less than or equal to zero, if the most recent packet having an updated arrival state less than or equal to zero is not the beginning packet of the set.

18. The medium of claim 15, wherein the consolidating comprises:

comparing an arrival state of the packet with an arrival state of a prior packet that immediately precedes the packet, wherein the arrival state of a respective packet corresponds to a state of the Leaky Bucket at an arrival time of the respective packet; and consolidating the packet information of the prior packet with the packet information of a packet immediately preceding the prior packet, if an arrival state of the prior packet is greater than the arrival state of the packet.

19. The medium of claim 15, wherein the consolidating comprises:
setting a consolidated arrival time equal to an arrival time of an earliest arriving packet of the consecutive packets; and
setting a consolidated packet length equal to a sum of packet lengths of the consecutive packets.

20. The medium of claim 15, wherein the method further comprises selecting a service level based on the stored one or more modified Leaky Bucket parameters.

* * * * *

UNITED STATES PATENT AND TRADEMARK OFFICE
CERTIFICATE OF CORRECTION

PATENT NO. : 8,385,205 B2
APPLICATION NO. : 11/858856
DATED : February 26, 2013
INVENTOR(S) : John Belden Kenney Page 1 of 1

It is certified that error appears in the above-identified patent and that said Letters Patent is hereby corrected as shown below:

In the Claims:

<u>COLUMN 18:</u>

Line 45, "packet;" should read --packets;--.

Signed and Sealed this
Twenty-eighth Day of May, 2013

Teresa Stanek Rea
*Acting Director of the United States Patent and Trademark Office*